United States Patent [19]

Altmann

[11] Patent Number: 4,847,481

[45] Date of Patent: Jul. 11, 1989

[54] ARRANGEMENT FOR DETERMINING THE POSITION OF A MODULATED LASER BEAM IN A SCATTERING MEDIUM

[75] Inventor: Konrad Altmann, Munich, Fed. Rep. of Germany

[73] Assignee: Messerschmitt-Bölkow-Blohm GmbH, Munich, Fed. Rep. of Germany

[21] Appl. No.: 138,601

[22] Filed: Dec. 28, 1987

[30] Foreign Application Priority Data

Jan. 17, 1987 [DE] Fed. Rep. of Germany ....... 3701296

[51] Int. Cl.$^4$ .......................... G01J 1/20; G08G 5/00; G01B 11/26
[52] U.S. Cl. ................................ 250/203 R; 356/152; 340/956
[58] Field of Search ............... 244/3.13; 356/152, 141; 250/203 R; 455/611; 350/358; 340/956, 958

[56] References Cited

U.S. PATENT DOCUMENTS

| | | | |
|---|---|---|---|
| 3,875,400 | 4/1975 | Pao et al. | 350/358 |
| 4,196,346 | 4/1980 | McElhannon | 455/611 |
| 4,664,518 | 5/1987 | Pfund | 356/152 |
| 4,691,385 | 9/1987 | Tupman | 356/152 |
| 4,710,028 | 12/1987 | Grenier et al. | 356/152 |

OTHER PUBLICATIONS

Plotkin et al., "Optical Communication in Free Space", Chapter 3, Report No: AGARO-AG-195, 12/74, pp. 3-1 to 3-9.

Primary Examiner—David C. Nelms
Assistant Examiner—Michael Messinger
Attorney, Agent, or Firm—Kenyon & Kenyon

[57] ABSTRACT

An arrangement for position finding of a laser beam in a scattering medium with a laser transmitter and a laser receiver followed by an evaluation circuit. In order to be able to differentiate in the incoming laser radiation the unscattered coherent content and the scattered content, the laser transmitter is connected to a modulation circuit for intensity modulation of the transmitted laser beam with a characteristic modulation frequency ($f_L > 1/T_s$) with the pulse duration spread being $T_s$, which a brief laser pulse experiences upon being scattered in the medium. In addition, the receiver is connected to an electronic frequency filter tuned to the characteristic modulation frequency. Thereby, essentially only the unscattered coherent content of the laser beam is utilized for evaluation.

11 Claims, 2 Drawing Sheets

ARRANGEMENT FOR DETERMINING THE POSITION OF A MODULATED LASER BEAM IN A SCATTERING MEDIUM

BACKGROUND OF THE INVENTION

The present invention relates to an arrangement for determining the position of a laser beam in a scattering medium.

Such arrangements are required in a number of technical applications, for example, in guide beam processes for the guidance of flying bodies or for landing approach control. In particular, such methods require precise determination of the position of the laser beam even in scattering media, for example, smog, fog, smoke or water and the angular precision of this determination should be of the order of magnitude of the original beam divergence of the laser beam, which means, in the range of a few milliradians. For example, in a guide beam process for guiding a flying body, the laser beam scans the surroundings of the flying body in a particular pattern. On the basis of the time, at which the laser beam sweeps over a sensor on the back of the flying body, the position of the flying body relative to a target can be determined in the flying body. This forms the basis for obtaining data for guiding the flying body. In addition, it is possible to modulate the laser beam within a given range in order to transmit in this way commands to the flying body, for example, controlling signals. When a continuous wave laser is used, this as well as other methods can essentially only be used up to a standard meteorological range of sight of 1 to 2 km. If the optical range is less, the laser beam is scattered in the surrounding medium to such an extent that definite position finding is no longer possible. This fact is briefly explained:

If a laser beam is lased through a scattering medium, for example, smog or fog, a fraction of the laser irradiation is scattered, weakening the original laser beam. The radiation registered by a receiver I is composed additively of an unscattered coherent fraction $I_c$ and the incoherent scattered fraction $I_i$, i.e. the relationship $$\rho I = I_c + I_i$$

applies.

If the starting intensity of the laser beam is called $I_0$, then the coherent content is $$I_c = I_0 \exp(-\tau)$$

where $\tau$ is the optical depth or thickness of the medium and given by $$\tau = L\sigma_e$$

where L is the geometric distance between the laser transmitter and the receiver and $\sigma_e$ the extinction coefficient of the medium. The relationship $$\sigma_e = \sigma_s + \sigma_a$$

applies, where $\sigma_s$ is the scattering coefficient and $\sigma_a$ the absorption coefficient of the medium.

The scattered content $I_i$ is a function of the scattering coefficient $\sigma_s$ and of the scattering characteristic of the particles of the scattering medium. If the wavelength of the laser is smaller or comparable to the diameter of the scattering particles in the medium, then the scattered radiation is directed forward and spreads in an angular range of a few degrees around the axis of the laser beam.

If the wavelength of the laser beam is greater than the diameter of the scattering particles, the scattered radiation spreads over a wider angular range.

Compared to the coherent radiation, however, the beam divergence of which is, in general, of the order of magnitude within the milliradian range, a background always originates, in which the original and coherent laser beam disappears with increasing optical depth and thickness $\tau$. This is evident in FIG. 1, in which the course of the beam profile of a laser beam with aerosol scattering as a function of distance $\rho$ in cm from the beam axis for different scattering coefficients $\sigma_s$ and a distance of 3 km between laser transmitter and laser receiver is plotted. The beam profiles are standardized to the beam axis and indicated logarithmically as radiation intensity. It is obvious that even with a relatively small scattering coefficient the beam profile is spread to such an extent that a somewhat exact determination of the position of the laser beam is no longer possible.

Since the scattered radiation has the same wavelength as the coherent radiation, they can not be differentiated from each other with optical filters. With a receiver based on conventional designs, therefore, at optical depths $\tau \gtrsim 10$ corresponding to a standard meteorological range of approximately 500 m only very imprecise determinations of the position of the laser beam depending on the angular distribution of the scattered radiation are still possible. For the technical applications mentioned above such inexact position finding of the laser beam is no longer tolerable.

SUMMARY OF THE INVENTION

It is an object of the present invention to provide an arrangement of the kind under discussion such that the position of a laser beam even in strongly scattering and optically dense media can be determined simply and reliably so that the precision of this position finding can be improved even at great distances between laser transmitter and laser receiver.

The above and other objects of the invention are achieved by an arrangement for finding the position of a laser beam in a scattering medium with a laser transmitter and a laser receiver coupled to an evaluation circuit, wherein the laser transmitter is coupled to a modulation circuit for intensity modulation of the transmitted laser beam with a characteristic modulation frequency $f_L$, where $f_L$ is significantly greater than $1/T_s$ and $T_s$ is the pulse duration spreading which a laser pulse experiences upon scattering in the medium, and the receiver is coupled to an electronic frequency filter tuned to the characteristic modulation frequency.

In the arrangement according to the invention, the different response over time of the coherent radiation and the laser radiation which is incoherent due to scattering is utilized. For better comprehension, widening of single pulses in time will be described first.

If a very brief single laser pulse is transmitted through a scattering medium, the course in time of the coherent content remains unchanged. In the scattered content, however, the shape of the laser pulse is changed. Since the scattered photons do not reach the receiver directly like the coherent radiation does but, in general, are detoured by way of several scattering processes, they arrive time-delayed. Consequently, as shown in FIG. 2, the laser pulse is widened and its center of gravity displaced in the backward direction. In FIG. 2 the intensity of the unscattered coherent content $I_c$ and that of the incoherent scattered content $I_i$ over time is shown. Widening of the laser pulse depends on the scattering characteristic of the discrete particles in the scattering medium, and, in the case of strong forward scattering, is approximately inversely proportional to the square of the optical depth $\tau$. Such strong scattering in the forward direction occurs, for example, when neodymium lasers are used in the free atmosphere. In this case, at a distance of 3 km between laser transmitter and receiver and an optical depth $=10$ in the scattered light a pulse width $T_s$ of approximately 100 ns is obtained. The number corresponds to a standard visual range of 500 m. Through scattering, therefore, the response of the output signal of the receiver in time is considerably altered and smoothed. This becomes clear when the two fractions $I_c$ and $I_i$ in FIG. 2 are added. It can be described mathematically by calling the pulse shape of a transmitted, very brief pulse changed through the scattered light, a so-called $\sigma$ pulse, $G(t)$. The radiation as a function of time is then given by the convolution integral $$I_s(t) = \int G(t-t') I_i(t') dt'$$

Continuing with the above given numerical example, a pulse sequence with a distance of 10 ns between the pulses yields in the scatttered radiation an approximately constant intensity level, which—corresponding to the stochastic character of the scattering processes— is superimposed by irregular fluctuations. The coherent radiation, in contrast, retains the response over time of the original radiation, which means it also has pulses with a distance of 10 ns. This fact is utilized in the invention as a basis for a surprisingly simple technical arrangement for differentiation between scattered radiation and coherent radiation and thus for precise position finding of a laser beam. For this purpose, the intensity of the laser radiation is modulated with a characteristic modulation frequency $f_L$, which is significantly greater than the reciprocal value of the pulse width mentioned above, thus significantly greater than $1/T_s$. Using the above given numbers as a basis, a characteristic modulation frequency of approximately 100 MHz is obtained. The precise shape of the modulation is unimportant here. It can, for example, be sine-shaped. In order to obtain high peak values for the intensity and, in this way, compensate the weakening of the coherent radiation, which is already pronounced anyhow, according to a preferred model of the invention, however, modulation is carried out in the form of pulses equidistant in time with the duration of the single pulses as short as possible. In order to accomplish this, coupling of the longitudinal modes of the laser is recommended, which permits realization of pulse sequences even in the MHz range.

In order to increase the peak values of the pulses achieved by coupling the longitudinal modes even further, it is recommended to shorten them through optical pulse compression. Such methods are described in the literature, see for example, B. Nikolaus and D. Grischkowsky, Pulse compression using optical fibers, in: Physics of New Laser Sources, eds. N.V. Abraham et al., NATO ASI Series B: Physics Vol. 132. Through such processes 1-ps-pulses of a few $TW/cm^2$ can be achieved.

In addition to the optical filter the receiver is also equipped with an electronic filter, which follows the photo detector and is formed so that it filters out the signal corresponding to the incoherent scattered content $I_i$, which only shows some stochastic fluctuations. In this way, because of the additivity of coherent and incoherent radiation, the former is separated from the latter permitting precise position finding of the laser beam even in strongly scattering media over great distances.

The electronic filter can be developed so that it only permits passage of the characteristic modulation frequency of the laser within a given bandwidth. However, it can also permit other frequency ranges to pass, which then can be utilized for data transmission between laser transmitter and receiver, for instance, to transmit the above mentioned controlling signals to a flying body.

If laser transmitter and receiver more relative to each other, the Doppler shift must be taken into account also, i.e. the electronic frequency filter in the receiver must be tuned to the Doppler-shifted frequency. However, due to the magnitude of the speed of light, for most practical applications this is without significance.

Particularly advantageous is use of the arrangement in accordance with the invention in the above mentioned guide beam process of the guidance of flying bodies. With an arrangement according to the invention, this guide beam process can be utilized for low standard visual ranges of a few hundred meters, so that also at distances of more than twice those of known processes between laser transmitter and receiver, precise results for position finding can still be obtained.

Modulation of laser radiation with characteristic modulation frequency permits, moreover, differentiation between different lasers, which, for instance, can be utilized for controlling the flying body without needing to utilize lasers of different wavelengths for this purpose. This differentiation takes place through different high-frequency coding with different characteristic modulation frequencies. By varying the characteristic modulation frequency of a laser within a given range, data, for example, can additionally be transmitted.

DETAILED DESCRIPTION

Figure 1:
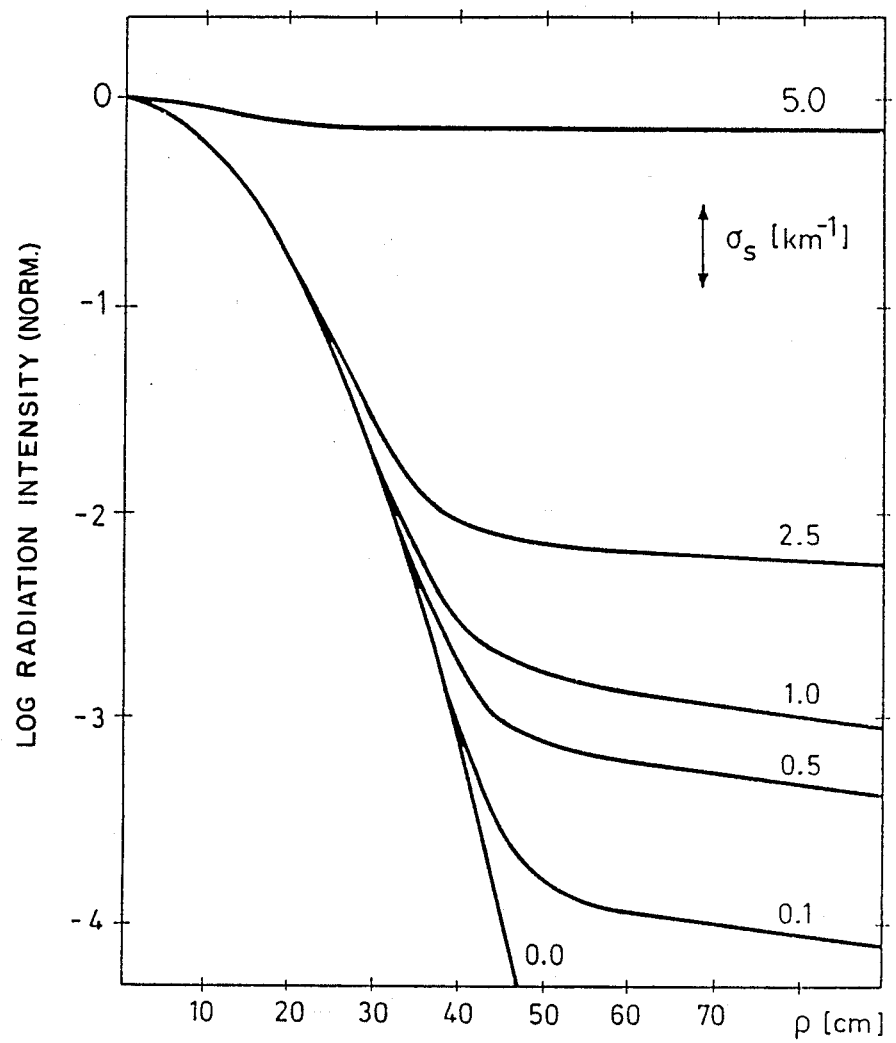
FIG. 1, as already described, is a diagram of the course of the beam profile of a laser beam with aerosol scattering as a function of distance $\rho$ in cm from the beam axis for different scattering coefficients $\sigma_s$ and with a distance of 3 km between laser transmitters and laser recliner.
Figure 2:
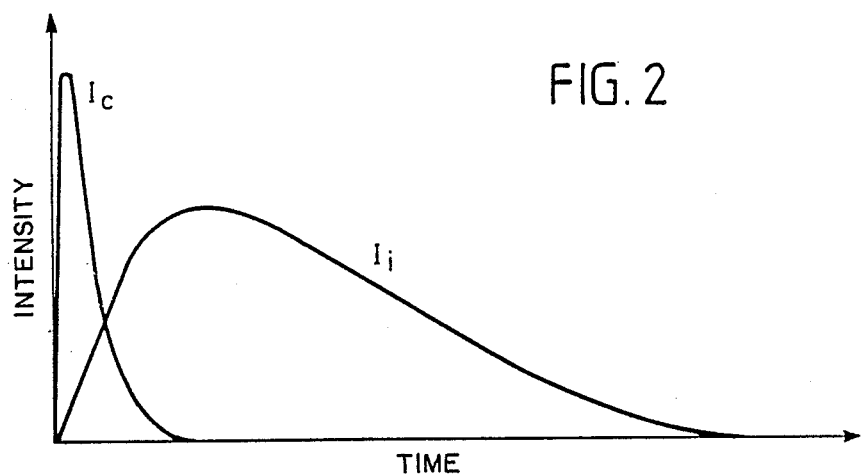
FIG. 2 shows the intensity of the unscattered coherent laser content $I_c$ and that of the incoherent scattered content $I_i$ over time.
Figure 3:
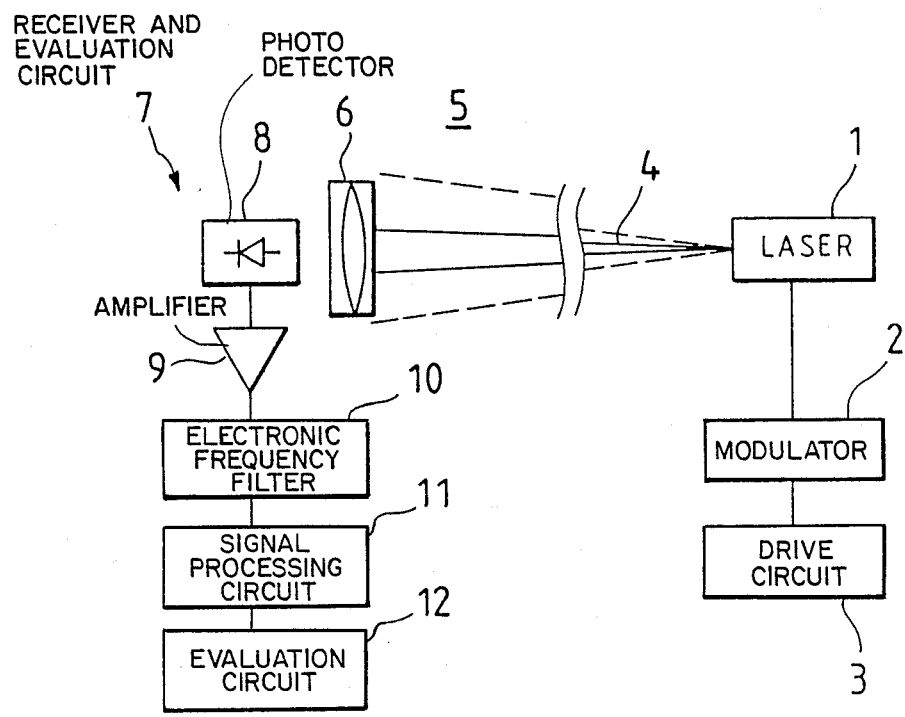
FIG. 3, shows an arrangement for position finding of a laser beam in the form of a block diagram.

As shown in FIG. 3, a laser 1 is connected to a modulator 2 and the latter to a drive circuit 3, by which the bundled laser beam 4 transmitted by laser 1 is modulated with a characteristic modulation frequency corresponding to the above discussion. The modulation of the laser beam is an intensity modulation in the form of time-equidistant short pulses. The pulse sequence is generated in the laser by coupling the longitudinal modes. Dashed lines in FIG. 3 indicate spreading of the laser beam through scattering in a scattering medium 5. The unscattered coherent laser beam 4 as well as the scattered content impinge on optics 6 in a receiver and evaluation circuit 7, with the optics additionally being equipped with a filter for the frequency of the laser radiation. The radiation is recorded by a photo detector 8, the electrical output signals of which are amplified in an amplifier 9 and, if necessary, supplied to an electronic frequency filter 10 subsequent to signal pre-processing. This electronic frequency filter allows only frequencies within the range of the characteristic modulation to pass and other frequency ranges can likewise be permitted to pass for the purpose of data transmission between laser and receiver. The output signals of the electronic filter are supplied to a signal processing circuit 11 and subsequently to an evaluation circuit 12, with which the position of the laser beam is determined. The photo detector 8 can also be developed so that it scans the laser beam transversely to the axis of the laser beam 4, for example, through motion of the photo detector. With it, the profile of the unscattered coherent content of the incoming radiation can be scanned.

It is equally possible to use laser beam scanning with the beam sweeping over the receiver and in this way determine the profile of the incoming laser beam and the position of the laser beam in time. In other applications it may be best if the laser beam is stationary and the entire receiving system 7 executes scanning motions.

These determinations take place in the evaluation circuit 12 according to conventional methods.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for finding the position of a laser beam in a scattering medium comprising a laser transmitter and a laser receiver, the laser receiver being coupled to an evaluation circuit, the laser transmitter being coupled to a modulation circuit for intensity modulation of the transmitted laser beam with a characteristic modulation frequency $f_L$, where $f_L$ is significantly greater than $1/T_s$ and $T_s$ is the pulse duration spreading comprising the increased pulse width of the incoherent portion of the laser beam which a laser pulse experiences upon scattering in the medium, the receiver being coupled to an electronic frequency filter tuned to the characteristic modulation frequency.

2. The apparatus recited in claim 1, wherein the electronic frequency filter only permits passage of the characteristic modulation frequency.

3. The apparatus recited in claim 2, wherein the electronic frequency filter permits passage of frequencies in other ranges in addition to the characteristic modulation frequency.

4. The apparatus recited in claim 1, wherein the modulation of the laser beam is in the form of a sequence of pulses equidistant in time.

5. The apparatus recited in claim 4, wherein the pulse sequence is generated in the laser transmitter by coupling of the longitudinal modes of the laser.

6. The apparatus recited in claim 4, wherein transmission of the discrete pulses through optical pulse compression is increased and the duration thereof is concurrently decreased.

7. The apparatus recited in claim 5, wherein transmission of the discrete pulses through optical pulse compression is increased and the duration thereof is concurrently decreased.

8. The apparatus recited in claim 4 wherein the electronic filter is tuned to the transmitted pulse sequence taking into consideration the pulse width.

9. The apparatus recited in claim 1, wherein the laser beam has a coherent content, and the receiver for scanning the profile of the coherent content of the incoming laser beam is moved transversely to the axis of the laser beam.

10. The apparatus recited in claim 1, wherein the laser transmitter executes an angular motion.

11. The apparatus recited in claim 1, wherein the laser receiver and the evaluation circuit are disposed on a flying body, and the laser transmitter transmits a laser beam to the flying body for the guidance of the flying body.

* * * * *

UNITED STATES PATENT AND TRADEMARK OFFICE
CERTIFICATE OF CORRECTION

PATENT NO. : 4,847,481
DATED : July 11, 1989
INVENTOR(S) : KONRAD ALTMANN

It is certified that error appears in the above-identified patent and that said Letters Patent is hereby corrected as shown below:

Col. 1, line 44, delete "p".

Col. 1, line 57, delete "θ" and insert therefor -- $\sigma$ --.

Cols. 3, line 24 after "$I_i$", second occurrence, change "(t)" to --(t')--.

Col. 4, line 16, change "more" to --move--.

Col. 4, line 43, insert following paragraph: --The invention will be explained in greater detail in conjunction with an embodiment shown schematically in FIG. 3, wherein an arrangement for position finding of a laser beam is represented in the form of a block diagram.--

Col. 4, line 49, change "recliner" to --receiver--.

Signed and Sealed this

Twenty-first Day of August, 1990

Attest:

HARRY F. MANBECK, JR.

*Attesting Officer*    *Commissioner of Patents and Trademarks*